Dec. 9, 1930.　　　　E. C. FRITTS　　　　1,784,281
PHOTOGRAPHIC CARTRIDGE
Filed Jan. 27, 1928　　　2 Sheets-Sheet 1
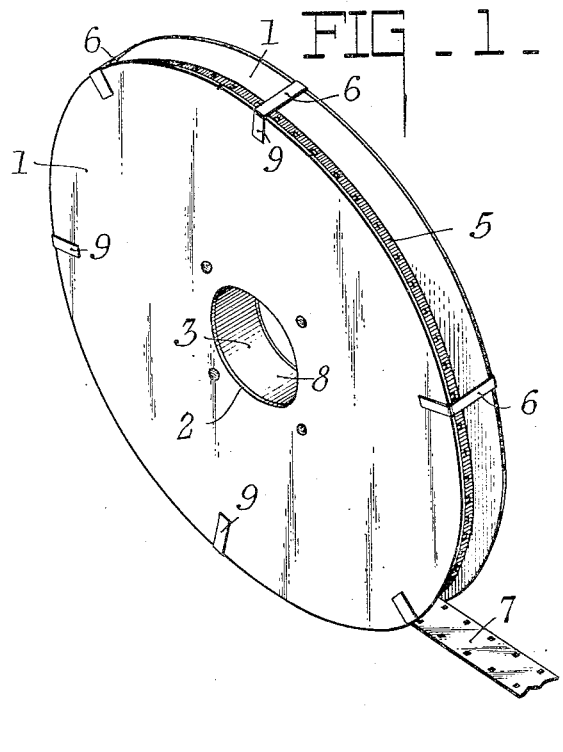
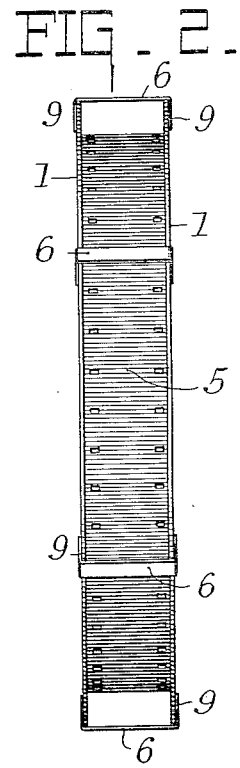
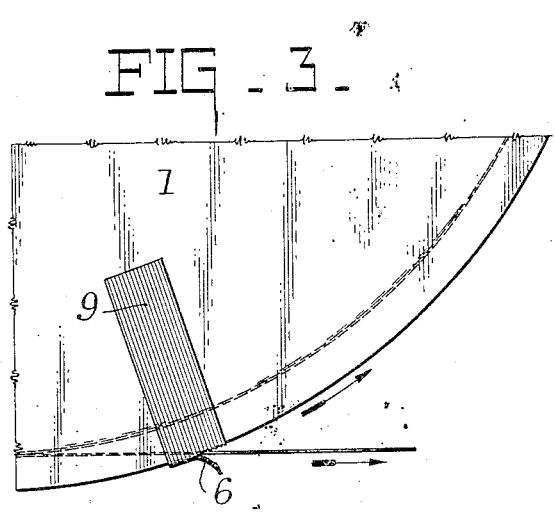
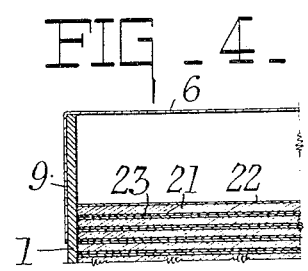
Inventor,
Edwin C. Fritts,
By R. L. Stinchfield
N. M. Perrins
Attorneys Dec. 9, 1930. E. C. FRITTS 1,784,281
PHOTOGRAPHIC CARTRIDGE
Filed Jan. 27, 1928 2 Sheets-Sheet 2
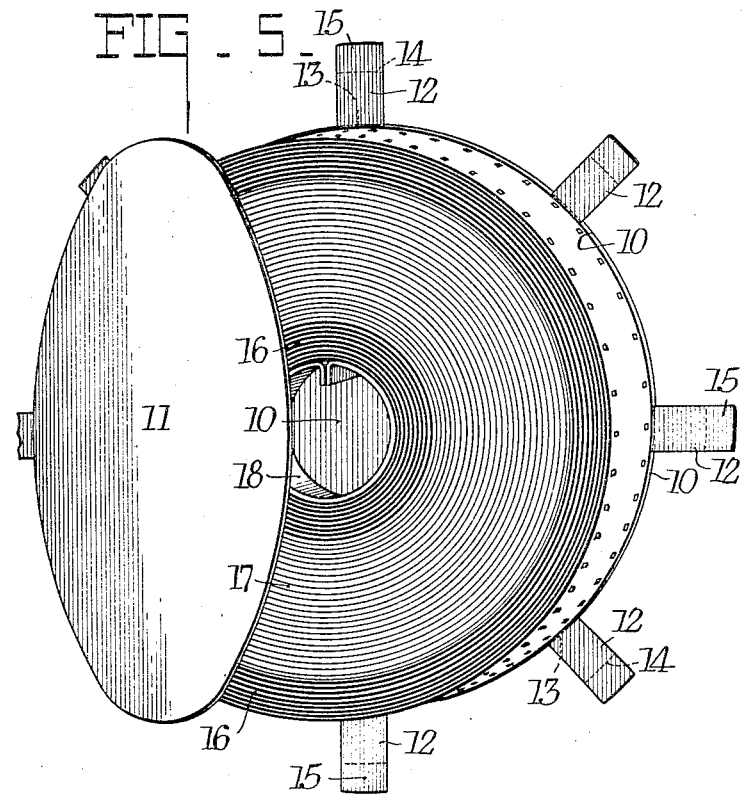
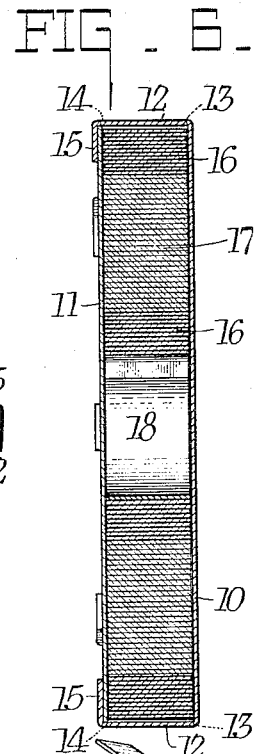
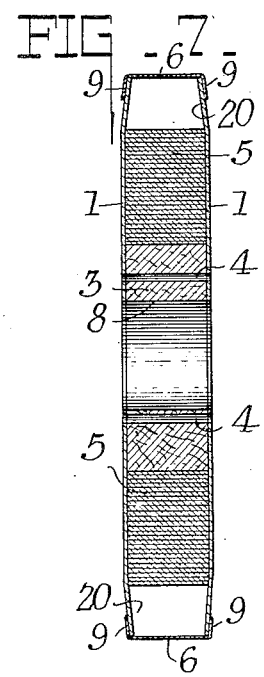
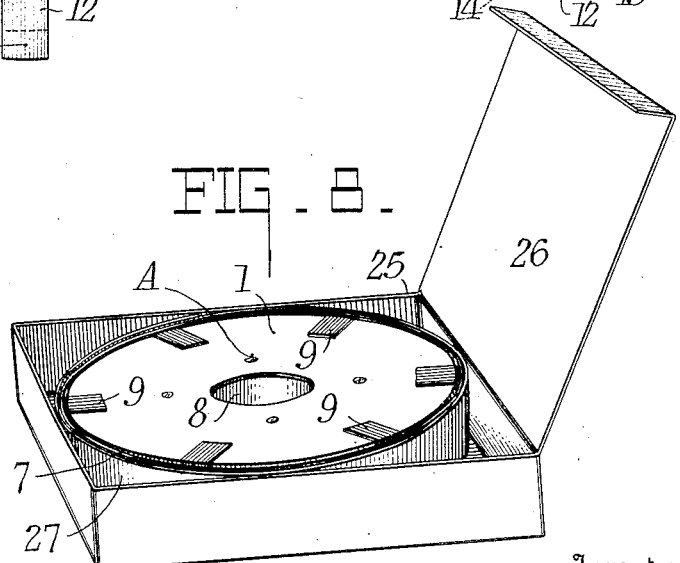
Inventor,
Edwin C. Fritts Patented Dec. 9, 1930

1,784,281

UNITED STATES PATENT OFFICE

EDWIN C. FRITTS, OF ROCHESTER, NEW YORK, ASSIGNOR TO EASTMAN KODAK COMPANY, OF ROCHESTER, NEW YORK, A CORPORATION OF NEW YORK

PHOTOGRAPHIC CARTRIDGE

Application filed January 27, 1928. Serial No. 249,935.

This invention relates to photographic cartridges, particularly of the type comprising a coiled band of sensitive film designed for insertion in daylight in a suitable camera.

Such a cartridge usually includes a spool which, after being used as a supply spool, may be used also as a take-up spool. Among the objects of my invention are to supply a spool of extremely cheap construction and intended for use only as a supply spool and then discarded.

It is desirable to use as inexpensive materials as possible in such an article, but film reels have not heretofore been made with heavy paper or light cardboard flanges since they were not sufficiently rigid. I have found that flanges of these materials may be used if the edges are connected securely together by strips that are not broken until after the cartridge is inserted in the camera and the camera closed. These strips are preferably of easily rupturable or severable material, which is broken when the outer coil of film which is stiffer and stronger than the strips is pulled out in unwinding.

Other features, advantages and objects of my invention will appear from the following description wherein reference is made to the accompanying drawings, in the several figures of which the same reference characters denote the same parts and wherein, Fig. 1 is a perspective view of a reel embodying my invention;

Fig. 2 is an edge view of such a reel;

Fig. 3 is a fragmentary side view showing the film as it tears a cross strip;

Fig 4 is a fragmentary section showing the relation of the film to the side wall;

Fig. 5 is a perspective view of the separated parts of modified form of my invention;

Fig. 6 is a section of this modified form;

Fig. 7 is a section of the preferred form of cartridge;

Fig. 8 is a perspective view of an open carton containing my improved cartridge.

The several embodiments of my invention herein disclosed are all simple in structure. The preferred form embodies two circular flanges or walls 1 of inexpensive material which has considerable flexibility, such as cardboard or stiff paper. The flanges have axial openings 2, and are attached, as by glue, to the ends of a core 3, having a central opening 8 and which may be of wood. Apertures 4 extend through the flanges and core and permit the positioning of the reel in a camera (not shown) having corresponding lugs.

The sensitized film band 5 is wound on the core and preferably the roll of film does not extend quite to the periphery of the flanges. The edges of the flanges are connected by cross strips 6, preferably of paper, which is pasted or glued at its ends 9 to the outer surfaces of the flanges or walls 1. These strips are of sufficient strength to hold the package together during ordinary usage, but they are materially weaker than the film band.

A modified, and even simpler, form is shown in Figs. 5 and 6. In this form, the side walls are unconnected at the center and comprise merely two imperforate discs 10 and 11, connected at separated points around their periphery with cross strips 12 which are readily torn or severed. As shown, these strips are formed as integral tabs extending from a disc 10 and are scored or otherwise weakened along the lines 13 of their junction with the disc 10 and also at 14, where they will be bent around the edge of the disc 11 when used. The end portion 15 of each tab or strip 12 is pasted or glued to the outer surface of disc 11. The film band is here shown as having terminal lead strips 16 and an intermediate sensitized film strip 17. The lead strips are of strong and rather stiff paper. A light paste board core or cylinder 18, unconnected with the discs 10 and 11, may be used within the coil, this being useful in the mechanical winding of the film in the manufacture of the cartridge.

The coil of the film may be, and preferably is, somewhat less in diameter than the side walls or flanges, as shown on an exaggerated scale in Figs. 2, 4 and 7. While the cross strips may be so applied as merely to hold the flanges snugly in contact with the edges of the coiled film band and without distortion at the edges, as in Figs. 2, 4 and 6. I prefer that the edge portions of the flanges be slightly inclined or bent toward one another as at 20, Fig. 7, where this is shown on an exaggerated scale. This tends to bind and securely hold the outer coils, preventing uncoiling and rendering the package light proof.

While separate end strips may be used, as shown in Figs. 5 and 6, I prefer to use a single continuous strip of film having a color layer on its rear surface as disclosed in the patent to Hickman, 1,638,577, granted August 9, 1927. Such a film is shown on an enlarged scale in Fig. 4, where sections of the outer convolutions are shown, the film support being designated 21, the emulsion layer 22 and the dye layer 23. This form is particularly advantageous in this cartridge since the flanges or walls, being of much more flexible material than is customary, have a greater tendency to buckle or wrinkle than has a sheet metal wall. While sheet metal has a certain amount of resiliency, its flexibility is not of the order of the cheaper materials I contemplate using.

The cartridge designated A in Fig. 8, is packed in a carton 25 here shown as a shallow box with a cover 26. A length 7 of the film band is left outside of the strips and is coiled loosely around the cartridges, and around this a paste-board ring 27 is placed.

In all of the forms flexible side walls are used which are connected at separated points around their edges by cross strips which are readily breakable or severable by the end portion of the film band, this end portion being stronger and stiffer than the cross strips.

In use, the cartridge will be removed from the carton, in daylight, and placed in a suitable camera, which may be a motion picture camera or a recording camera of the general type shown in the pending applications of Hopkins, Serial No. 237,467, filed December 3, 1927. The lead end 7 of the film strip may be passed through a suitable aperture in the magazine and drawn out and threaded in the camera. The tension thus caused will cause the spool to rotate until the film band engages the first cross strip. Because of the relative strength and stiffness of the film band, the pull upon it will tear, rupture or sever the cross strips in succession, during the first revolutions of the reel.

This will be under a fairly heavy strain or pull as the film is purposely withdrawn. The flanges being of light and flexible material will not, thereafter, engage the edges of the film with any appreciable friction and will permit it to roll freely, which is particularly desirable in a portable, compact, motion picture camera driven by a spring motor. In the type of cartridge shown in Figs. 5 and 6, the walls will fall away entirely from the film band.

I contemplate as included in my invention all such modifications and equivalents as fall within the scope of the appended claims.

Having thus described my invention, what I claim as new and desire to secure by Letters Patent is:

1. A photographic film cartridge comprising a band of sensitized material coiled into a roll, a side wall of flexible material on each side of said roll, readily severable strips connecting the edges of the two side walls and holding said flexible side walls in contact with the edges of the roll and thereby preventing the entrance of light and also preventing the roll from uncoiling.

2. A photographic film cartridge comprising a band of sensitized material coiled into a roll, a circular side wall of flexible material on each side of said roll, strips connecting the edges of the side walls and holding said flexible side walls in contact with the roll and thereby preventing the entrance of light and also preventing the band from uncoiling, the band being materially stiffer and stronger than the strips, whereby the strips may be ruptured when an outward strain is exerted upon the outermost coil of the band.

3. A photographic film cartridge comprising a spool having a core and flexible circular side walls, a band of sensitized material wound around said core and between said walls, strips connecting the peripheries of the walls and holding said flexible walls in contact with the wound band and thereby preventing the entrance of light and holding said band from unwinding, the band being materially stiffer and stronger than the strips, whereby the strips may be ruptured when an outward strain is exerted upon the outermost coil of the wound band and a length of the band protruding sufficient to extend several times around the outside of the cartridge and the strips whereby the cartridge may be placed in a camera with the strips unbroken and the protruding end of the band threaded in the camera.

4. A light tight film cartridge comprising a spool having a core and flexible circular side walls, a band of sensitized material wound around said core and between said walls, strips connecting the peripheries of the walls and holding said flexible walls securely in contact with the edges of the wound band and thereby preventing the entrance of light and holding said band from unwinding, the outer end of the band being of light protective material and being materially stiffer and stronger than the strips, whereby the strips may be ruptured when an outward strain is exerted on the outer end of the band.

5. A photographic film cartridge comprising a band of sensitive material coiled into a roll, a side wall of flexible material on each side of said wall, said material having insufficient rigidity of itself to maintain its position and protect the edges of the band from the effect of light, and cross strips of readily severable material connecting the edges of the walls and holding the walls tightly against the edges of the band and thus protecting the band from light.

6. A photographic film cartridge comprising a band of sensitive material coiled into a roll, a side wall of flexible material on each side of said wall, said material having insufficient rigidity of itself to maintain its position and protect the edges of the band from the effect of light, and cross strips of readily severable material connecting the edges of the walls and holding the walls tightly against the edges of the band and thus protecting the band from light, the end portion of the band being sufficiently stiff to rupture said strips when drawn outwardly against them in uncoiling the roll, whereby the cartridge may be placed in a camera with the strips unbroken and thereby protected from edge fogging and whereby the strips may be broken by the uncoiling of the band in the camera.

7. A photographic film cartridge adapted to be placed unopened in a camera and comprising a band of light sensitive material coiled into a roll, a side wall on each side of said roll, and strips of material connecting the edges of the two side walls, said strips of material being readily severable and the end portion of said band being sufficiently stiff to rupture said strips when drawn outwardly against them in uncoiling the roll, a free length of said band being outside of said connecting strips whereby the cartridge may be placed in a camera with the strips unbroken, the free length of the band threaded through the camera and the strips eventually broken by the use of the band in the camera.

Signed at Rochester, New York this 24 day of January, 1928.

EDWIN C. FRITTS.